US012377561B2

(12) United States Patent
Katsikas

(10) Patent No.: US 12,377,561 B2
(45) Date of Patent: Aug. 5, 2025

(54) RAZOR HEADS

(71) Applicant: BIC Violex Single Member S.A., Anoixi (GR)

(72) Inventor: Georgios Katsikas, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 308 days.

(21) Appl. No.: 18/176,530

(22) Filed: Mar. 1, 2023

(65) Prior Publication Data

US 2023/0278245 A1 Sep. 7, 2023

(30) Foreign Application Priority Data

Mar. 1, 2022 (EP) .................................... 22159515

(51) Int. Cl.

*B26B 21/38* (2006.01)
*B26B 21/06* (2006.01)
*B26B 21/40* (2006.01)
*B26B 21/52* (2006.01)
*B26B 21/54* (2006.01)

(52) U.S. Cl.

CPC .............. *B26B 21/38* (2013.01); *B26B 21/06* (2013.01); *B26B 21/405* (2013.01); *B26B 21/4062* (2013.01); *B26B 21/52* (2013.01); *B26B 21/54* (2013.01); *B26B 21/4056* (2013.01)

(58) Field of Classification Search

CPC ....... B26B 21/38; B26B 21/06; B26B 21/405; B26B 21/4062; B26B 21/52; B26B 21/54; B26B 21/4056

See application file for complete search history.

(56) References Cited

U.S. PATENT DOCUMENTS 3,631,595 A 1/1972 Scott et al.
6,481,104 B1 * 11/2002 Parker ..................... B26B 21/38 30/527
2005/0188540 A1 9/2005 Kelly et al.
(Continued)

FOREIGN PATENT DOCUMENTS

EP 0885698 A1 12/1998
EP 1885527 B1 3/2011
(Continued)

OTHER PUBLICATIONS

Extended European Search Report issued in European Application No. 22 15 9515 on Aug. 3, 2022 (10 pages).

*Primary Examiner* — Omar Flores Sanchez
(74) *Attorney, Agent, or Firm* — Bookoff McAndrews, PLLC

(57) ABSTRACT

A razor head may comprise one or more cutting members. The razor head of the first aspect further comprises a vibrating component configured to generate vibrations. The razor head of the present disclosure further comprises a structural element configured to transmit the vibrations from the vibrating component to the one or more cutting members. Furthermore, the vibrating component of the first aspect is disposed away from respective one or more cutting edges of the one or more cutting members towards an inner portion of the razor head, wherein the vibrating component is connected with the structural element. In the present disclosure, the structural element extends from the vibrating component towards the one or more cutting members.

20 Claims, 4 Drawing Sheets

(56) References Cited

U.S. PATENT DOCUMENTS

| | | | | |
|---|---|---|---|---|
| 2008/0148574 | A1* | 6/2008 | Chou | B26B 21/38 30/45 |
| 2008/0155831 | A1* | 7/2008 | Royle | B26B 21/4018 30/34.2 |
| 2008/0189953 | A1 | 8/2008 | Jessemey et al. | |
| 2009/0056142 | A1* | 3/2009 | Royle | B26B 21/38 30/42 |
| 2010/0064524 | A1* | 3/2010 | Mah | A47J 17/02 30/123.5 |
| 2010/0313425 | A1* | 12/2010 | Hawes | A45D 26/00 30/44 |
| 2013/0002055 | A1* | 1/2013 | Doll | B26B 21/38 310/25 |
| 2013/0070953 | A1* | 3/2013 | Dodd | B26B 21/521 381/398 |
| 2013/0160296 | A1* | 6/2013 | Park | B26B 21/38 30/34.05 |
| 2015/0251327 | A1* | 9/2015 | Chou | B26B 21/38 30/45 |
| 2016/0089800 | A1* | 3/2016 | Coresh | B26B 21/405 30/45 |
| 2018/0361603 | A1* | 12/2018 | Griffin | B26B 21/526 |
| 2019/0337173 | A1 | 11/2019 | Coresh | |
| 2021/0146560 | A1* | 5/2021 | Panagiotopoulou | B26B 21/44 |
| 2024/0252394 | A1* | 8/2024 | Lyles | B26B 19/3873 |

FOREIGN PATENT DOCUMENTS

| | | | |
|---|---|---|---|
| RU | 2320476 | C2 | 3/2008 |
| WO | 2007008625 | A1 | 1/2007 |
| WO | 2017034436 | A1 | 3/2017 |

* cited by examiner

RAZOR HEADS

CROSS-REFERENCE TO RELATED APPLICATIONS

This application claims priority from European patent application No. 22159515.0, filed on Mar. 1, 2022, the contents of which are hereby incorporated herein in their entirety by this reference.

TECHNICAL FIELD

The present disclosure relates to the field of razors, more specifically to a razor head, a shaving razor assembly comprising a razor head, and a kit of parts comprising a plurality of razor heads. The present disclosure is also related to a method of cleaning a razor head.

BACKGROUND

Razor heads (also known as safety razor heads, razor cartridges or safety razor cartridges) are usually part of a shaving razor assembly that includes a razor handle. A razor head typically comprises one or more cutting members, each including a blade, and being arranged between a leading longitudinal side and a trailing longitudinal side of the razor head. In use, a user holds the razor handle in a shaving direction and brings the razor head into contact with a portion of skin. By movement of the razor head in a shaving direction, unwanted hair is removed.

At the same time, when shaving, hair, skin cells and other shaving debris can accumulate in the cutting members. With some prior art razor heads, this typically results in the cutting members becoming dull over time and degrading their shaving performance. Furthermore, this may also lead to unhygienic conditions that may potentially cause injury or infection of the user's skin. Most of prior art techniques suggest manual cleaning of the razor heads to remove debris from cutting members as a solution to this problem. However, manual cleaning of razor blades is not reliable in many cases, as hair, skin cells and other shaving debris may still remain between cutting members after manual cleaning is completed. In addition, manual cleaning means, such as razor brushes, may come into direct contact with cutting edges of the cutting members during the cleaning process, which speeds up their dulling.

Therefore, it is desirable to improve the cleaning process of razor heads to reduce their dulling process, improve their performance and increase duration of their service.

SUMMARY

A first aspect of the present disclosure relates to a razor head comprising one or more cutting members. The razor head of the first aspect further comprises a vibrating component configured to generate vibrations. The razor head of the present disclosure further comprises a structural element configured to transmit the vibrations from the vibrating component to the one or more cutting members. Furthermore, the vibrating component of the first aspect is disposed away from respective one or more cutting edges of the one or more cutting members towards an inner portion of the razor head, wherein the vibrating component is connected with the structural element. In the present disclosure, the structural element extends from the vibrating component towards the one or more cutting members.

A second aspect relates to a shaving razor assembly comprising a razor head in accordance with the techniques of the first aspect, or its embodiments. The shaving razor assembly of the second aspect further comprises a razor handle. The razor head of the present disclosure is either releasably attached to the razor handle, integrally formed with the razor handle via a non-pivotable connection, or integrally formed with the razor handle via a pivotable connection.

In a third general aspect, the present disclosure relates to a kit of parts comprising a razor head holder. The razor head holder of the third aspect comprises a plurality of razor heads in accordance with the techniques of the first aspect, or its embodiments. Furthermore, the kit of parts of the third aspect comprises a razor handle.

The fourth aspect of the present disclosure relates to a method for cleaning a razor head. The method comprises providing a razor head in accordance with the techniques of the first aspect, or its embodiments. The method further comprises providing the razor handle. The razor handle of the fourth aspect comprises an activating element to operate the vibrating component of the razor head, wherein the vibrating component are configured to be operated by the activating element. Then, the method of the fourth aspect comprises activating the activating element of the razor handle to operate the vibrating component of the razor head for cleaning the one or more cutting members of the razor head.

Firstly, compared to some prior art techniques, the techniques of the present disclosure can allow for relatively simple automatic cleaning process of a razor head by using vibrating component (based on, e.g., a piezoelectric element) without requiring any effort from a user such as using manual means (e.g., razor brushes).

Secondly, compared to some prior art solutions, in the present technique the automatic cleaning process of the razor head may reduce the dulling process of the cutting members and prolong their lifetime. In particular, in some examples of the present techniques, the structural elements (e.g., resilient elements) may ensure controllable contact with the cutting members when transmitting vibrations from the vibrating component, avoiding a direct contact with their cutting edges.

Thirdly, in some examples of the present techniques, the vibrations of the vibrating component can be transmitted to each cutting member of the razor head, thereby providing more reliable and thorough cleaning of the cutting members compared to some prior art techniques.

Fourthly, a particular design of the structural element of the present techniques, which in some examples may involve the use of resilient elements, can allow for more efficient transmission of the vibrations to the cutting elements, thereby further improving the quality of the cleaning process.

Some terms are used in the present specification in the following manner (see also detailed explanations further below):

In the following specification, the term "cutting member" refers to a component of a razor head that, in use, contacts the skin of a user and cuts protruding hairs.

The term "vibrating component" as used herein should be broadly construed in the present disclosure referring to any element such as, e.g., a piezoelectric element or any other element that is capable of generating vibrations around its initial equilibrium position in response to an applied electric field or electromagnetic radiation.

The term "structural element" as used herein should be broadly construed in the present specification referring to any element that is capable of transmitting vibrations (e.g., a resilient element, more specifically, a metallic spring).

The term "leading" as used herein means the side of the razor head that contacts a portion of a user's skin first, in normal use.

The term "trailing" refers to the side of the razor head that contacts a portion of a user's skin last, in normal use.

DETAILED DESCRIPTION

First, a general overview over the techniques of the present disclosure related to a razor head of the first aspect will be given in connection with FIGS. 1*a*, 1*b* and FIGS. 2*a*, 2*b*. Then, some further aspects of the present disclosure will be given on the example of FIG. 3, where a shaving razor assembly comprising the razor head is shown. Last, various aspects related to a method for cleaning a razor head will be given in connection with a flow chart shown in FIG. 4.

Figure 1A:
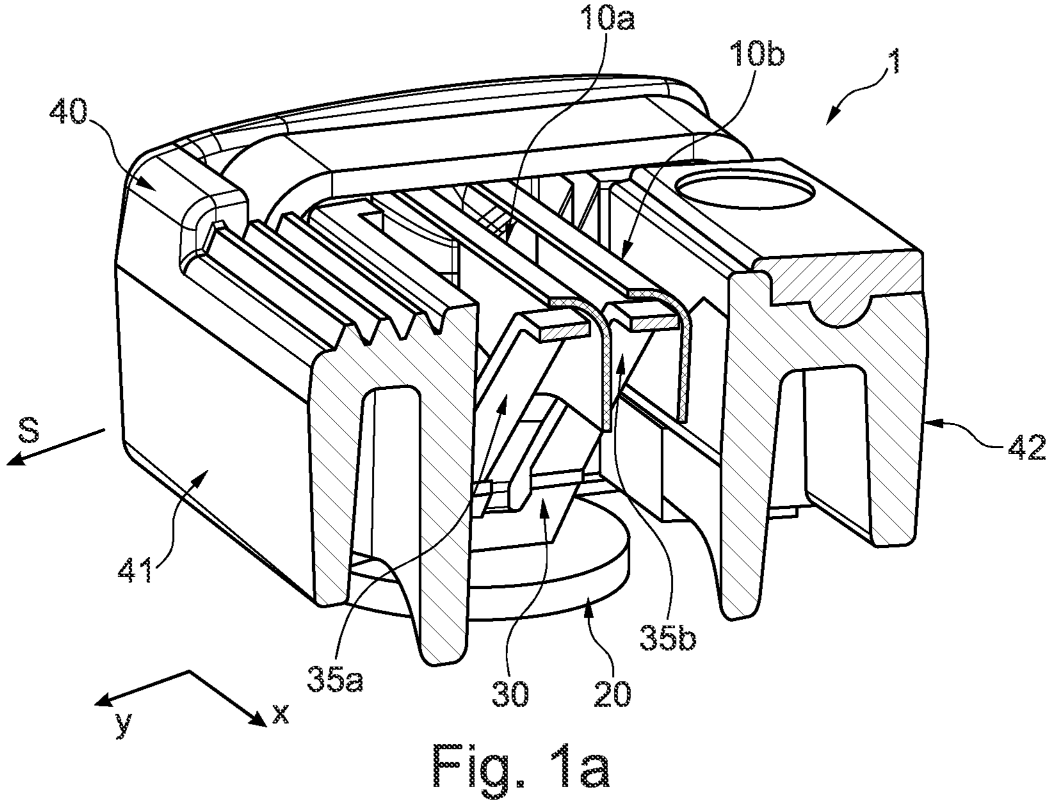
FIGS. 1*a* and 1*b* show two cut-away views of a razor head of the first aspect for schematic illustration of the arrangement of cutting members, a structural element and a vibrating component of the razor head in a transversal (FIG. 1*a*) and a longitudinal direction (FIG. 1*b*).
Figure 1B:
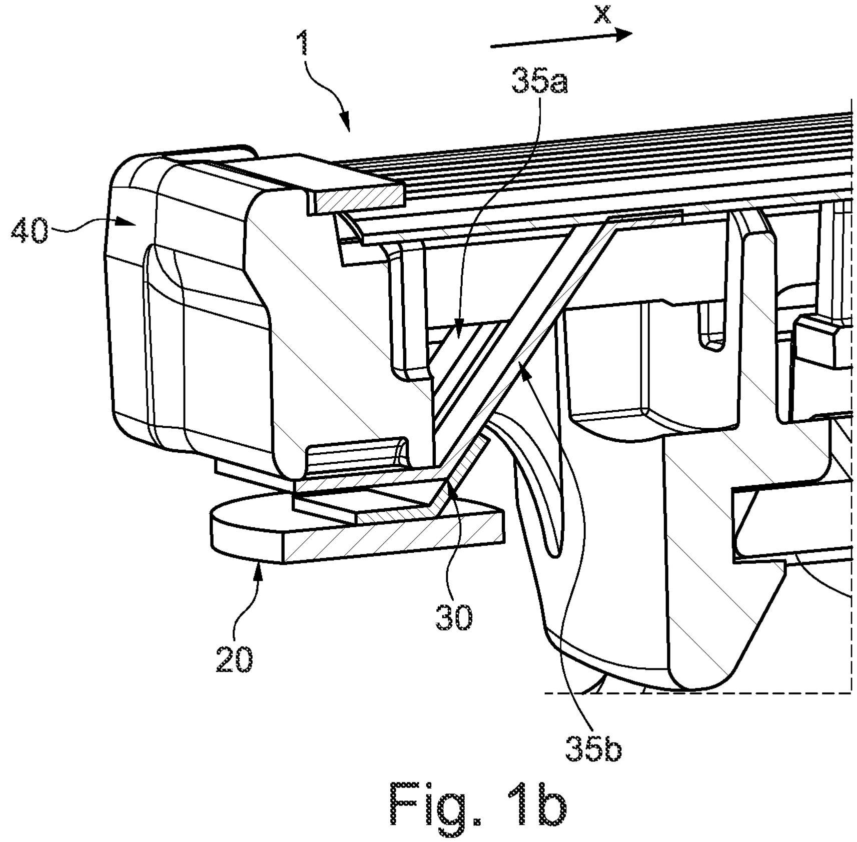

FIGS. 1*a* and 1*b* are two cut-views in the transversal direction y and, respectively, in the longitudinal direction x of a razor head 1 with two cutting members 10*a*, 10*b*, a structural element 30 with, for example, two resilient elements 35*a*; 35*b* such as metallic springs and a vibrating component 20 (comprising, e.g., a piezoelectric element). The transversal direction is perpendicular to the longitudinal direction and is substantially parallel to a shaving direction S. In the embodiment exemplified in FIGS. 1*a* and 1*b*, the cutting members 10*a*, 10*b* are disposed in a recess between the leading 41 and trailing 42 longitudinal sides of a housing 40 of the razor head 1.

In the present techniques, a razor head 1 comprises one or more cutting members 10*a*, 10*b* (e.g., one, two, three, four, five, six, seven, eight or more cutting members). Furthermore, the razor head comprises a vibrating component 20; 20*a*, 20*b* (e.g., a piezoelectric element or any other vibrating component, see discussions below) configured to generate vibrations. In the techniques of the present disclosure, the razor head 1 further comprises a structural element 30; 30*a*, 30*b* configured to transmit the vibrations from the vibrating component to the one or more cutting members. In this way, the razor head can be cleaned from hair, skin cells and other shaving debris in the cutting members accumulated after shaving. The structural element may include, e.g., resilient elements 35*a*, 35*b*, as shown in FIGS. 1*a*, 1*b*, 2*a* and 2*b*, to facilitate the transmission of vibrations (see discussions further below). In some cases, the vibrating component can exhibit mechanical oscillations about its initial equilibrium position in reaction to an applied electric field or electromagnetic radiation (e.g., when a respective source of the electric field or electromagnetic radiation is activated). In the embodiments of FIGS. 1*a*, 1*b* and 2*b*, the vibrating components 20 are shown to be manufactured substantially as a thin cylinder, i.e., when a ratio of the radius of the cylinder to its height is, e.g., 3 or more, 5 or more, 10 or more, 50 or more, 100 or more, so that longitudinal or transversal vibrations of the thin cylinder can be induced by applying electromagnetic radiation or the thin cylinder may exhibit longitudinal or transversal vibrations when the electric field is applied to its respective facets. In some examples, the radius of the cylinder may be within an interval of 1 mm to 10 mm, or within an interval of 2 mm to 5 mm. In some cases, the height of the cylinder may lie within an interval of 0.4 mm to 8 mm, or within an interval of 0.8 mm to 4 mm. A geometrical form of the vibrating component is not limited to the cylindrical form shown in these figures: In other examples the vibrating component can be made in any other geometrical form. In the non-exhaustive example, the vibrating component may be spatially extended in two dimensions (similar to the vibrating component manufactured as the thin cylinder shown in FIG. 2*b*) and can take any shape in a cross-section along its spatial extensions, e.g., a substantially elliptical or any other shape.

In the present specification, the vibrating component 20 is disposed away from respective one or more cutting edges of the one or more cutting members 10*a*, 10*b* towards an inner portion of the razor head, as shown in FIG. 1*a*. In addition, the vibrating component of the present techniques is connected with the structural element 30 (e.g., by a respective fastening element). Thus, the vibrations produced by the vibrating component, when the vibrating component is in operation, may be imparted to the structural element. Furthermore, the structural element extends from the vibrating component towards the one or more cutting members. For example, the vibrating component 20 shown in FIGS. 1*a* and 1*b* is connected with the structural element 30 that extends from the vibrating component to two cutting members 10*a*, 10*b* of the razor head 1. In the techniques of the present disclosure, the structural element can be configured to be in contact with the one or more cutting members at least some time during the operation of the vibrating component to transmit the vibrations from the vibrating component to the one or more cutting members. In some cases, the structural element may come into contact only with those portions of the cutting members (e.g., with their respective inner surfaces), which do not include cutting edges, thereby avoiding the dulling process of the cutting members.

In some examples of the present techniques, the vibrating component can comprise one or more of a piezoelectric element, an electrostrictive element, a ferroelectric element and a magnetostrictive element. In some embodiments, the vibrating component comprises the piezoelectric element. For example, the piezoelectric element may comprise a piezoelectric ceramic material or a piezoelectric polymer. In a non-exhaustive example the piezoelectric ceramic material may comprise one or more of a lead zirconate titanate (PZT) material, barium titanate (BT) material, and strontium titanate (ST) material. The electrostrictive element of other embodiments can comprise an electrostrictive ceramic material or an electrostrictive polymer, such as, e.g., a P(VDF-TrFE-CFE) polymer.

Figure 3:
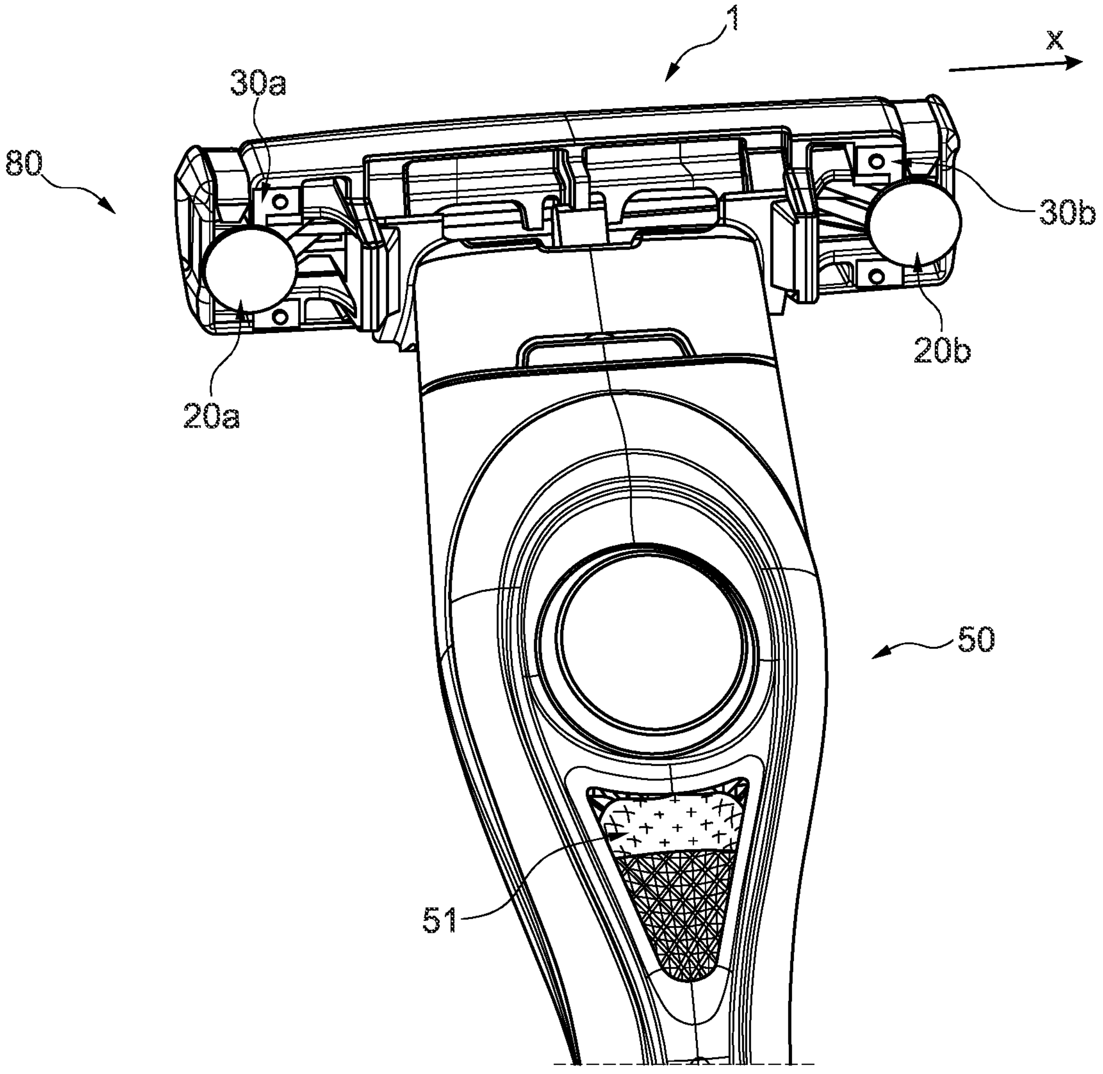
FIG. 3 is a schematic view of a shaving razor assembly according to the present disclosure.
Figure 4:
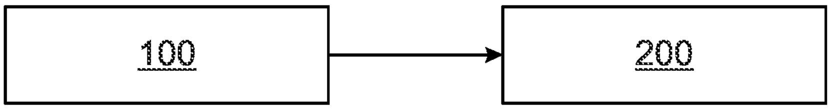
FIG. 4 is a flow diagram illustrating a method for cleaning a razor head of the first aspect.

The razor head 1 of the present specification may comprise two or more structural elements 30*a*, 30*b* and two or more vibrating components 20*a*, 20*b*. In an example, each vibrating component of the two or more vibrating components can be connected with respective structural element of the two or more structural elements. In some cases, a first structural element 30*a* of the at least two structural elements can be disposed on a first side of a longitudinal extension of the razor head and a second structural element 30*b* of the at least two structural elements can be disposed on a second side of the longitudinal extension of the razor head that is opposite to the first side. In the example of FIG. 3 the razor head 1 extends along a longitudinal axis x, such that the first side corresponds to the left side of the razor head, while the second side to its right side (when a shaving razor assembly 80 of FIG. 3 is viewed from behind). In some examples, more than two structural elements with the same number of vibrating component can be used in the present techniques (e.g., three or more, four or more, five or more, six or more, eight or more, ten or more structural elements and vibrating component). In some circumstances more than a single vibrating component, e.g. with the respective structural element, may be used to speed up the cleaning process of a razor head.

The structural element 30 of the first aspect can be mounted on a rear side of the razor head being opposite to a front side of the razor head that is in contact with a shaving surface when the razor head is in use. For example, the structural element 30 in the embodiment of FIGS. 1*a* and 1*b* is mounted on the rear side of the razor head. In the present specification, the two or more structural elements (e.g., the first and second structural elements 30*a*, 30*b*) can be mounted on the rear side of the razor head. For example, the first and second structural elements 30*a*, 30*b* shown in FIG. 3 are mounted on the rear side of the razor head. In an example, the structural element can be mounted to a structural element support of the razor head disposed inside the razor head (not shown in the figures). In some cases, the structural element 30 can include a mounting portion 36 disposed, e.g., on respective one or more facets of the structural element (see FIGS. 2*a* and 2*b*) such that the structural element can be attached to the rear side of the razor head (or, alternatively, to the structural element support mentioned above) by attaching the mounting portion of the structural element to the rear side. The structural element 30 of the first aspect can be mounted on the rear side of the razor head 1 by a fastening element. In one example, the fastening element may comprise one or more rivets so that the mounting portion of the structural element can be fastened to the rear side of the razor head by means of the one or more rivets. In other examples, the fastening element can comprise glue so that the mounting portion of the structural element 30 can be glued to the rear side of the razor head. In still other examples, the fastening element can comprise one or more pins. In yet other examples, any combinations of the fastening elements may also be contemplated in the present specification.

The vibrating component 20 of the first aspect can be connected with the structural element 30 by a fastening element. The fastening element used to connect the vibrating component and the structural element can comprise glue, one or more rivets, a magnet, or any combination thereof. When connected, the vibrating component 20 may form a single assembly with the structural element 30, as illustrated in FIG. 2*b*.

In the techniques of the present disclosure, the structural element 30 can comprise one or more resilient elements 35*a*, 35*b* (e.g., metallic springs 35*a*, 35*b* shown in FIG. 2*a*), wherein the resilient element (e.g., each resilient element) of the one or more resilient elements is configured to be in contact with a respective cutting member from the one or more cutting members at least some time during the operation of the vibrating component to transmit the vibrations from the vibrating component to the one or more cutting members 10*a*, 10*b*. In the embodiments shown in FIGS. 1*a* and 1*b*, the vibrating component 20 is connected with the structural element 30, and each of the two resilient elements 35*a*, 35*b* (manufactured as, e.g., two metal springs) of the structural element extends from the vibrating component to a corresponding cutting member of the two cutting members 10*a*, 10*b* of the razor head 1. For example, the resilient element 35*a* shown in FIG. 1*a* can touch the cutting member 10*a* at some moments of time during the operation of the vibrating component, while the resilient element 35*b* can touch the cutting member 10*b* at the same or other moments of time, thereby transmitting the vibrations from the vibrating component to the cutting members. In the present specification, the resilient element (e.g., each resilient element) of the one or more resilient elements 35*a*, 35*b*, in response to the vibrations produced by the vibrating component 20 during its operation, can exert a force onto the respective cutting member. The force exerted onto the respective cutting member may be a function of time. In one example, the time-dependent force can be a periodic function of time whose period is substantially equal to a period of vibrations that the vibrating component 20 (e.g., the piezoelectric element) generates. In some cases, the period of the exerted time-dependent force may lie within one of the intervals, [0.7 T, 1.3 T], [0.9 T, 1.1 T], and [0.95 T, 1.05 T], where T stands for the period of vibrations produced by the vibrating component 20. In other examples, the exerted force may be a non-periodic function of time (for example, when the vibrations generated by the vibrating component are non-periodic). The resilient element (e.g., each resilient element) of the one or more resilient elements can bend during the operation of the vibrating component.

In the present specification, the resilient element (e.g., each resilient element) of the one or more resilient elements 35*a*, 35*b* of the structural element may be a spring (e.g., a metallic spring). In other examples, the resilient element (e.g., each resilient element) of the one or more resilient elements 35*a*, 35*b* may be a beam (manufactured similar to, e.g., a cantilever beam). In still other examples, the resilient element (e.g., each resilient element) of the one or more resilient elements 35*a*, 35*b* may be a slab. In yet other examples, the one or more resilient elements can be manufactured as any combinations of the springs, beams, and slabs in the present specification. In some cases, the resilient element (e.g., each resilient element) of the one or more resilient elements 35*a*, 35*b* may comprise a flexible material. In some examples, the one or more resilient elements 35*a*, 35*b* may be integrally formed with the mounting portion 36 of the structural element 30. In other examples, the one or more resilient elements 35*a*, 35*b* can be connected with the mounting portion 36 of the structural element 30 (e.g., using a suitable fastening element). In still other examples, the mounting portion of the structural element 30 may be absent so that the resilient element (e.g., each resilient element) of the one or more resilient elements 35*a*, 35*b* of the structural element 30 can be mounted directly on the rear side of the razor head 1 or to its structural element support disposed inside the razor head by the fastening element (which may comprise the one or more rivets, glue, the one or more pins, or any combination thereof, as mentioned above).

Figure 2A:
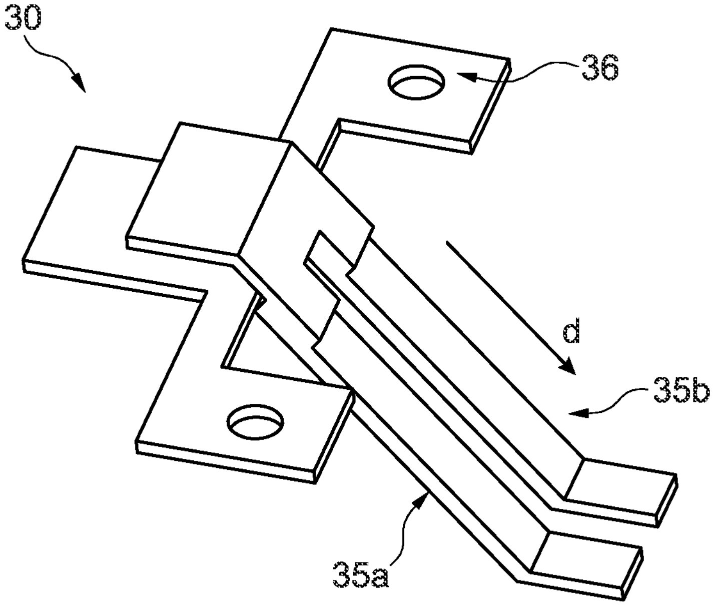
FIG. 2*a* shows schematically a possible configuration of the structural element, and FIG. 2*b* exemplifies the vibrating component connected to the structural element of FIG. 2*a*.
Figure 2B:
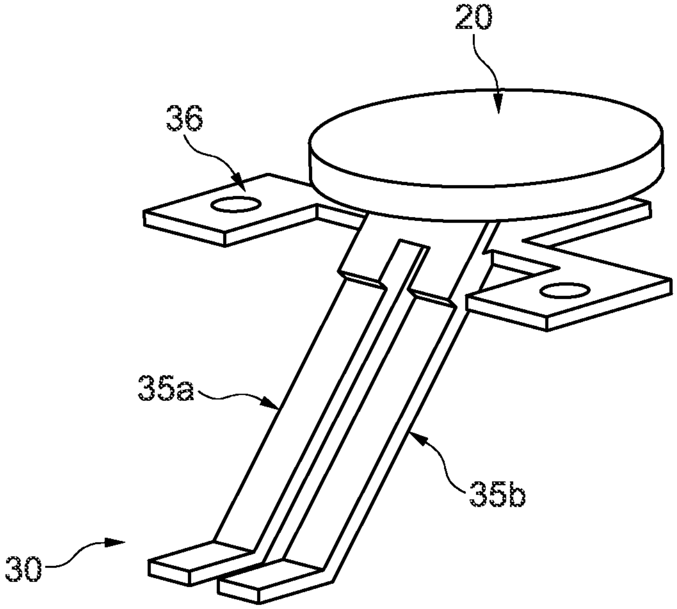

In the present techniques, the razor head can extend longitudinally along a longitudinal axis (x) and the resilient element of the one or more resilient elements 35*a*, 35*b* of the structural element 30 can extend from the vibrating component 20 towards the respective cutting member from the one or more cutting members 10*a*, 10*b* along a first direction (d) (see, e.g., FIG. 2*a*). In some cases, the first direction of one resilient element of the one or more resilient elements 35*a*, 35*b* is different form the first direction of another resilient element of the one or more resilient elements 35*a*, 35*b* (provided that more than one resilient element is present). In other cases, the one or more resilient elements (e.g., each resilient element) may share the same first direction. The longitudinal axis (x) along which the razor head 1 of the first aspect can extend may form a predetermined angle with respect to the first direction (d). The predetermined angle can be equal to 20° or more, 40° or more, 60° or more, 70° or more, 80° or more.

In some examples of the present techniques, the cutting member (e.g., each cutting member) of the one or more cutting members 10*a*, 10*b* can be an integrally formed cutting member comprising a radiused bend, and a cutting edge formed at a distal end of the radiused bend. In this case, the cutting member can be referred to as a "bent blade". In other examples, the cutting member (e.g., each cutting member) of the one or more cutting members 10*a*, 10*b* can comprise a blade (e.g., the blade with a cutting edge) attached to the cutting member. In some cases, the cutting member can comprise a blade support having a blade mounting portion disposed on an inner surface or on an outer surface of the blade support, wherein the blade can be attached to the blade mounting portion. For example, the razor blade may be glued, or laser welded to the blade support (e.g., to the blade mounting portion of the blade support). The cutting members of the razor head (e.g., when the razor head comprises more than one cutting member) can be of the same type (e.g., all cutting members may be bent blades) or can be of different types in the above-defined sense.

In the present specification, the razor head 1 may comprise a housing 40 extending longitudinally along a longitudinal axis (see, e.g., the x-axis shown in FIGS. 1*a*, 1*b* and 3). The housing of the first aspect can comprise a leading longitudinal side 41, a trailing longitudinal side 42, and a recess in between the leading and trailing longitudinal sides for accommodating the one or more cutting members 10*a*, 10*b* (for example two cutting members illustrated in FIGS. 1*a* and 1*b*). In some cases, the one or more cutting members 10*a*, 10*b* can be disposed at least partially in the recess. Furthermore, each cutting member of the one or more cutting members can be arranged between a leading longitudinal side and a trailing longitudinal side of the recess in a shaving direction S of the razor head. In some cases, the structural element 30; 30*a*, 30*b* can be mounted on a rear side of the housing being opposite to a front side of the housing that is in contact with a shaving surface when the razor head is in use.

A second aspect of the present disclosure provides a shaving razor assembly 80 comprising a razor head 1 in accordance with the techniques of the first aspect, or its embodiments. The shaving razor assembly of the second aspect further comprises a razor handle 50 (as illustrated in FIG. 3). The razor head 1 of the present disclosure is either releasably attached to the razor handle, integrally formed with the razor handle via a non-pivotable connection, or integrally formed with the razor handle via a pivotable connection.

The razor handle 50 of the second aspect can comprise an activating element to operate the vibrating component 20; 20*a*, 20*b* of the first aspect. In some examples, the activating element can be one of a wireless activating element or an electronic circuit configured to induce vibrations in the vibrating component 20; 20*a*, 20*b* (which comprises, e.g., one or more of a piezoelectric element, an electrostrictive element, a ferroelectric element and a magnetostrictive element). In this case, the longitudinal or transversal vibrations of the vibrating component can be induced by the electromagnetic radiation that may be emitted by the wireless activating element or the electronic circuit. Alternatively, the activating element can be directly connected with the vibrating component 20 of the first aspect, for example, using a respective number of cables (e.g., one or more, or two or more cables) that extend from the activating element of the razor handle 50 to corresponding facets of the vibrating component. In this case, the longitudinal or transversal vibrations of the vibrating component may occur in response to an electric field applied to its corresponding facets supplied by the activating element (e.g., to two opposite facets of the vibrating component 20 shown in FIG. 2*b*). The vibrating component 20 of the present specification can be configured to be operated by the activating element of the second aspect. The razor handle 50 can further comprise a battery (e.g., a rechargeable or replaceable battery) to supply electric power for the activating element. In an example, the activating element can be activated by a user (e.g. manually by pressing a power button) to clean the razor head. In some cases, the activating element can be deactivated manually by the user, for example, by releasing the power button or by pressing the button once again. In other cases, the activating element can be deactivated automatically after a predetermined time window has elapsed (e.g., after 1 sec or more, 5 sec or more, after 10 sec or more). For example, the predetermined time window may be set by the user prior to the cleaning process. The razor handle 50 of the present specification may further comprise a controller configured to deactivate the activating element after the predetermined time window has elapsed.

In a third general aspect, the present disclosure relates to a kit of parts (not shown in figures) comprising a razor head holder. The razor head holder of the third aspect comprises a plurality of razor heads 1 in accordance with the techniques of the first aspect, or its embodiments. Furthermore, the kit of parts further comprises a razor handle 50. More specifically, the kit of parts may comprise the razor handle 50 according to the second aspect as described above.

The fourth aspect of the present disclosure relates to a method for cleaning a razor head 1. The method comprises providing 100 a razor head 1 in accordance with the techniques of the first aspect, or its embodiments. The method further comprises providing 200 the razor handle 50. The razor handle of the fourth aspect comprises an activating element to operate the vibrating component 20; 20*a*, 20*b* of the razor head 1. The vibrating component of the fourth aspect are configured to be operated by the activating element. The method of the fourth aspect further comprises activating 200 the activating element of the razor handle 50 to operate the vibrating component of the razor head 1 for cleaning the one or more cutting members 10*a*, 10*b* of the razor head.

In the techniques of the present disclosure, the razor handle of the fourth aspect can be the razor handle of the second aspect, or its embodiments. In some cases, when the razor head of the present disclosure is releasably attached to the razor handle, the method of the fourth aspect can further comprise coupling the razor handle 50 to the razor head 1.

The invention claimed is:

1. A razor head comprising:

one or more cutting members;

two or more vibrating components configured to generate vibrations;

two or more structural elements configured to transmit the vibrations from the two or more vibrating components to the one or more cutting members, wherein the two or more vibrating components are disposed away from respective one or more cutting edges of the one or more cutting members towards an inner portion of the razor head, wherein the two or more vibrating components are connected with the two or more structural elements, wherein the two or more structural elements extend from the two or more vibrating components towards the one or more cutting members, wherein each vibrating component of the two or more vibrating components is connected with respective structural element of the two or more structural elements, and wherein a first structural element of the two or more structural elements is disposed on a first side of a longitudinal extension of the razor head and a second structural element of the two or more structural elements is disposed on a second side of the longitudinal extension of the razor head that is opposite to the first side.

2. The razor head of claim 1, wherein the two or more vibrating components comprise one or more of a piezoelectric element, an electrostrictive element, a ferroelectric element and a magnetostrictive element.

3. The razor head of claim 1, wherein the two or more structural elements are configured to be in contact with the one or more cutting members at least some time during the operation of the two or more vibrating components to transmit the vibrations from the two or more vibrating components to the one or more cutting members.

4. The razor head of claim 1, wherein the two or more structural elements are mounted on a rear side of the razor head being opposite to a front side of the razor head that is in contact with a shaving surface when the razor head is in use.

5. The razor head of claim 1, wherein the two or more structural elements comprise one or more resilient elements, wherein the resilient element of the one or more resilient elements is configured to be in contact with a respective cutting member from the one or more cutting members at least some time during the operation of the two or more vibrating components to transmit the vibrations from the two or more vibrating components to the one or more cutting members.

6. The razor head of claim 5, wherein the resilient element of the one or more resilient elements of the two or more structural elements is one of a spring, a beam, and a slab.

7. The razor head of claim 5, wherein the resilient element of the one or more resilient elements, in response to the vibrations produced by the two or more vibrating components during operation, exerts a force onto the respective cutting member, wherein the force exerted onto the respective cutting member is a function of time.

8. The razor head of claim 5, wherein the razor head extends longitudinally along a longitudinal axis and the resilient element of the one or more resilient elements of the two or more structural elements extends from the two or more vibrating components towards the respective cutting member from the one or more cutting members along a first direction, wherein the longitudinal axis forms a predetermined angle with respect to the first direction.

9. The razor head of claim 1, wherein the cutting member of the one or more cutting members is an integrally formed cutting member comprising a radiused bend, and a cutting edge formed at a distal end of the radiused bend, or wherein the cutting member of the one or more cutting members comprises a blade attached to the cutting member.

10. The razor head of claim 1, further comprising:

a housing extending longitudinally along a longitudinal axis, wherein the housing comprises a leading longitudinal side, a trailing longitudinal side, and a recess in between the leading and trailing longitudinal sides for accommodating the one or more cutting members, wherein the one or more cutting members are disposed at least partially in the recess, wherein each cutting member of the one or more cutting members is arranged between a leading longitudinal side and a trailing longitudinal side of the recess in a shaving direction of the razor head, wherein the two or more structural elements are mounted on a rear side of the housing being opposite to a front side of the housing that is in contact with a shaving surface when the razor head is in use.

11. A shaving razor assembly comprising:

a razor head according to claim 1;

a razor handle, wherein the razor head is either releasably attached to the razor handle, integrally formed with the razor handle via a non-pivotable connection, or integrally formed with the razor handle via a pivotable connection.

12. The shaving razor assembly of claim 11, wherein the razor handle comprises an activating element to operate the vibrating component of the razor head, wherein the activating element is one of a wireless activating element or an electronic circuit configured to induce vibrations in the vibrating component, wherein the vibrating component are configured to be operated by the activating element.

13. A kit of parts comprising:

a razor head holder comprising a plurality of razor heads according to claim 1, and a razor handle.

14. A method for cleaning a razor head comprising:

providing a razor head according to claim 1;

providing a razor handle;

wherein the razor handle comprises an activating element to operate the vibrating component of the razor head, wherein the vibrating component is configured to be operated by the activating element;

activating the activating element of the razor handle to operate the vibrating component of the razor head for cleaning the one or more cutting members of the razor head.

15. A razor head comprising:

one or more cutting members;

a vibrating component configured to generate vibrations;

a structural element configured to transmit the vibrations from the vibrating component to the one or more cutting members, a housing extending longitudinally along a longitudinal axis, wherein the vibrating component is disposed away from respective one or more cutting edges of the one or more cutting members towards an inner portion of the razor head, wherein the vibrating component is connected with the structural element, wherein the structural element extends from the vibrating component towards the one or more cutting members, wherein the housing comprises a leading longitudinal side, a trailing longitudinal side, and a recess in between the leading and trailing longitudinal sides for accommodating the one or more cutting members, wherein the one or more cutting members are disposed at least partially in the recess, wherein each cutting member of the one or more cutting members is arranged between a leading longitudinal side and a trailing longitudinal side of the recess in a shaving direction of the razor head, and wherein the structural element is mounted on a rear side of the housing being opposite to a front side of the housing that is in contact with a shaving surface when the razor head is in use.

16. The razor head of claim 15, wherein the vibrating component comprises one or more of a piezoelectric element, an electrostrictive element, a ferroelectric element and a magnetostrictive element.

17. The razor head of claim 15, wherein the structural element is configured to be in contact with the one or more cutting members at least some time during the operation of the vibrating component to transmit the vibrations from the vibrating component to the one or more cutting members.

18. A shaving razor assembly comprising:

a razor head, comprising:

one or more cutting members;

a vibrating component configured to generate vibrations;

a structural element configured to transmit the vibrations from the vibrating component to the one or more cutting members, a razor handle, wherein the razor handle comprises an activating element to operate the vibrating component of the razor head, wherein the razor head is either releasably attached to the razor handle, integrally formed with the razor handle via a non-pivotable connection, or integrally formed with the razor handle via a pivotable connection, wherein the activating element is one of a wireless activating element or an electronic circuit configured to induce vibrations in the vibrating component, wherein the vibrating component is configured to be operated by the activating element, wherein the vibrating component is disposed away from respective one or more cutting edges of the one or more cutting members towards an inner portion of the razor head, wherein the vibrating component is connected with the structural element, wherein the structural element extends from the vibrating component towards the one or more cutting members.

19. The shaving razor assembly of claim 18, wherein the vibrating component comprises one or more of a piezoelectric element, an electrostrictive element, a ferroelectric element and a magnetostrictive element.

20. The shaving razor assembly of claim 18, wherein the structural element comprises one or more resilient elements, wherein the resilient element of the one or more resilient elements is configured to be in contact with a respective cutting member from the one or more cutting members at least some time during the operation of the vibrating component to transmit the vibrations from the vibrating component to the one or more cutting members.

* * * * *